United States Patent [19]

McDonald

[11] Patent Number: 5,824,166
[45] Date of Patent: Oct. 20, 1998

[54] INTERMETALLIC ALLOYS FOR USE IN THE PROCESSING OF STEEL

[75] Inventor: Robert R. McDonald, Traverse City, Mich.

[73] Assignee: Metallamics, Traverse City, Mich.

[21] Appl. No.: 246,578

[22] Filed: May 20, 1994

Related U.S. Application Data

[63] Continuation of Ser. No. 834,598, Feb. 12, 1992, abandoned.

[51] Int. Cl.⁶ .................................................. C22C 19/05
[52] U.S. Cl. ......................... 148/428; 420/445; 420/460
[58] Field of Search .................................. 148/428, 429; 420/460, 445, 446, 447, 448, 449, 450; 29/724

[56] References Cited

U.S. PATENT DOCUMENTS

| | | | |
|---|---|---|---|
| 3,026,197 | 3/1962 | Schramm | 420/81 |
| 3,970,450 | 7/1976 | Liu et al. | 420/461 |
| 4,144,059 | 3/1979 | Liu et al. | 420/435 |
| 4,238,229 | 12/1980 | Liu et al. | 148/707 |
| 4,253,872 | 3/1981 | Liu et al. | 420/1 |
| 4,410,371 | 10/1983 | Liu et al. | 148/707 |
| 4,612,165 | 9/1986 | Liu et al. | 420/459 |
| 4,613,368 | 9/1986 | Chang et al. | 420/460 |
| 4,647,427 | 3/1987 | Liu | 420/435 |
| 4,711,761 | 12/1987 | Liu et al. | 420/459 |
| 4,722,828 | 2/1988 | Liu | 420/455 |
| 4,731,221 | 3/1988 | Liu | 420/455 |
| 4,839,140 | 6/1989 | Cathcart et al. | 420/455 |
| 4,961,903 | 10/1990 | McKamey et al. | 420/79 |
| 5,413,876 | 5/1995 | Santella et al. | 420/445 |

FOREIGN PATENT DOCUMENTS

| | | |
|---|---|---|
| 1244676 | 11/1988 | Canada . |
| 091292 | 10/1983 | European Pat. Off. . |
| 0397231 | 11/1990 | European Pat. Off. . |
| 2153845 | 8/1985 | United Kingdom . |
| 2182053 | 5/1987 | United Kingdom . |
| 9010722 | 9/1990 | WIPO . |

OTHER PUBLICATIONS

M. G. Fontana, "Corrosion Engineering", 3rd Ed., McGraw–Hill Book Company: New York, 1986, pp. 505–507 and 520–529.

"Superalloys, A Technical Guide", Ed. E.F. Bradley, (ASM International 1988), pp. 31, 32, 36, 109–114, 122.

"Metal Conveyor Belts," 1935 (The Dressing and Screening company, Ltd.) (DRESCOL) pp. 1–30.

"Ordered Intermetallics" by C. T. Liu et al, Metals Handbook, 10th Edition, vol. 2, ASM International, pp. 913–942© 1992.

An Encyclopedia of Metallurgy and Materials by c.R. Tottle, pp. 4, 5, 145© 1984.

"Ordered Intermetallic Alloys" by C.T. Liu et al., pre–publication copy given to applicant in Feb. 1991.

*Primary Examiner*—George Wyszomierski
*Attorney, Agent, or Firm*—Reising, Ethington, Learman & McCulloch, PLLC

[57] ABSTRACT

Described is a material handling apparatus for processing heated formed ferrous metal products and/or glass products comprising a face centered cubic crystal intermetallic alloy of a metal aluminide having the property of withstanding repeated thermal cycling from ambient temperature to about 1600° F. wherein the metal is selected from the group consisting of a group VIII metal of the Periodic Table. Also described is an aluminide roll that also is characterized as retaining its ultimate tensile strength at 1600° F. of at least 75% of the tensile strength the roll had at ambient room temperature.

12 Claims, 1 Drawing Sheet

INTERMETALLIC ALLOYS FOR USE IN THE PROCESSING OF STEEL

This is a continuation of application Ser. No. 07/834,598 filed on Feb. 12, 1992, now abandoned.

TECHNICAL FIELD

The invention is concerned with the intermetallic alloys of metals with aluminum, and in particular with the face centered cubic crystals of metal aluminides and their application as tooling, fixturing and components (parts) used in the processing, fabrication and manufacturing of iron containing alloys such as steel or glass products.

BACKGROUND ART

U.S. Pat. No. 4,990,181 is directed to porous sintered aluminide structures of aluminum, nickel, titanium and/or rare earth metal.

U.S. Pat. No. 4,850,717 teaches a process sensor tube having erosion and corrosion resistance which is adapted for sensing process conditions which has a coating of an aluminide of nickel.

U.S. Pat. No. 4,867,116 teaches a spark-ignited internal combustion engine exhaust valve having on the critical surfaces thereof nickel aluminide.

U.S. Pat. No. 4,769,210 teaches an apparatus for use in liquid alkali environment such as nuclear fuel sub-assembly which has bearing surfaces coated with nickel aluminide.

U.S. Pat. No. 4,762,558 pertains to the production of reactive sintered nickel aluminide material utilizing hot isostatic compaction.

U.S. Pat. No. 4,676,829 pertains to cold worked tri-nickel aluminide.

U.S. Pat. Nos. 4,650,519 and 4,661,156 pertain to hot isostatic pressing of nickel aluminide from powder. In a similar fashion, see U.S. Pat. Nos. 4,613,480 and 4,609,528.

U.S. Pat. No. 4,495,252 teaches a wear-resistant metallic article employing a mixture of nickel aluminide in a copper-based matrix.

U.S. Pat. No. 4,362,696 teaches corrosion-resistant fuel cladding alloy for liquid metal fast-breeder reactors which utilizes nickel aluminum intermetallic phases.

Other patents related to aluminide alloys are U.S. Pat. Nos. 3,970,450; 4,144,059; 4,238,229; 4,253,872; 4,410,371; 4,612,165; 4,647,427; 4,711,761; 4,722,828; 4,731,221; 4,839,140; 4,961,903; and Canadian Patent No. 1,244,676.

Improvement To The Art

The general deficiencies of metallic elements and their alloys when used as tooling, fixturing, components and general structural items (parts) for use at elevated temperatures (i.e. 1200° F. to 2300° F.) is as follows:

the strength and toughness values diminish as the temperature increases rendering parts made from such materials less useful in withstanding structural loads, especially beyond 1500° F. to 2300° F.;

the resistance to attack by oxygen diminishes with increasing temperatures rendering parts made from such materials vulnerable to dimensional loss, load bearing failure, loss of surface integrity, and general incapacity to perform their function, especially with temperatures beyond 1200° F. to 2300° F.;

the resistance to creep and fatigue diminishes with increasing temperatures along with the strength and toughness rendering parts made from such materials vulnerable to thermal shock, thermal cycle fatigue, load cycle fatigue, cracking, dimensional loss, load bearing failure, breakage, and general incapacity to perform their function, especially beyond 1500° F. to 2300° F.;

the resistance to attack by carbon diminishes in many of these materials with increasing temperatures rendering parts made from such materials vulnerable to embrittlement, load bearing failure, and general incapacity to perform their function, especially beyond 1500° F. to 2300° F.; and the resistance to abrasive wear diminishes in parallel to the general decline in strength and toughness rendering parts made from such materials vulnerable to galling, welding, seizing, loss of dimensional integrity, and general incapacity, especially beyond 1200° F. to 2300° F.

However, there is a class of metal alloys that provides the basis for significant improvement in the aforementioned performance deficiencies which arise at elevated temperatures and in turn permits one to make industrially useful parts that provide a significantly better performance than parts made from their generally available metallic alloy counterparts. This class of metal alloys are the intermetallic alloys or intermetallic compounds which are defined as an alloy or compound of two or more metals which has a distinctive crystallographic structure and definite composition or composition range.

It is an object of the present invention to provide material handling apparatus for processing heated formed ferrous metal products and/or hot glass products fabricated of intermetallic alloys of a face centered cubic crystal of a metal aluminide.

It is another object of the present invention to provide fixtures and components (i.e. parts) that are useful for the processing, fabrication and manufacture of hot steel objects based on the application of intermetallic alloys as parts, especially the alloys based on the face centered cubic crystal of a metal aluminide.

It is also an object of the invention to provide a heat treatment furnace roll of an intermetallic alloy as used in the support and transfer of hot steel objects within steel heat treat furnaces with the said rolls having the property of withstanding the load bearing requirements, the resistance to oxidation, the resistance to scaling, the resistance to wear, the resistance to carburization, the resistance to creep and fatigue and generally the ability to usefully be applied in the operating environment.

It is also an object of the invention to provide a heat treat furnace roll made of an intermetallic alloy that has the ability to retain its ultimate tensile strength at 1600° F. of at least 75% of the ultimate tensile strength that the heat treat furnace roll had at ambient temperature, and further provide useful structural load bearing capacity at temperatures up to 2300° F.

It is a further object of the invention to provide a steel slab soaking furnace roll made of an intermetallic alloy as used in the support and transfer of steel slabs in soaking furnaces that has the ability to be useful at temperatures up to 2300° F. without regard to roll cooling wherein such a roll is able to provide useful load bearing capability, resistance to wear, resistance to oxidation and scaling and general useful product life in this application.

It is also an object of the invention to provide tubes and other industrial fixturing and components (i.e. parts) made of an intermetallic alloy as used in furnaces and in other unit operations for steel that have the ability to withstand the effects of carbon on such parts which often lead to embrittlement, cracking and failure of such when used at elevated temperatures (e.g. 1400° F. to 2300° F.) whereby such parts would be subjected to carburization, whether intentionally when such parts are used in the unit operation of carburization of steel objects or whether such are merely exposed to such conditions as a matter of course.

It is a further object of the invention to provide tools made of intermetallic alloys which are to be used in the manufacture of steel products from steel raw materials (e.g. rolling, forming, piercing, extrusion, drawing, swaging and other such unit operations) at elevated temperatures, especially within the temperature range of 1400° F. to 2300° F. wherein such tooling should retain at least 75% of its ultimate tensile strength at 1600° F. in comparison to the strength of the tool at ambient temperatures.

SUMMARY OF THE INVENTION

The invention is the design and manufacture of intermetallic alloys and their application to the industrial tooling, fixtures and equipment used in the fabrication, processing and manufacture of steel products made at elevated temperatures.

The specific intermetallic alloys to be used in this invention are based on the face centered cubic crystal system of the intermetallic alloy family where one of the major constituent elements is selected from the elemental group containing nickel, a Group VIII metal of the Periodic Table, and the other major constituent element is selected from the elemental group containing aluminum, a Group III metal of the Periodic Table. The building block of this family of alloys is based then on the intermetallic alloy $Ni_3Al$. To this alloy one may add other specific elements, especially those from the Group IV, V and VI of the Periodic Table, so as to produce an intermetallic alloy which as a specific set of mechanical and physical properties which will be required by the specific end product for use in the working environment.

The fabrication, processing and manufacture of steel products is often done at elevated temperatures, especially in the range of 1200° F. to 2300° F. The historically available materials of construction used in steel processing at such elevated temperatures are the ACI heat resistant casting alloys which are based on combinations of iron, chromium and nickel to which are added other minor elemental constituents. These alloys have mechanical and physical property deficiencies which become pronounced at elevated temperatures, especially at temperatures above 1400° F. Parts made from these alloys manifest these property deficiencies at elevated temperatures as gross dimensional distortions, cracks, embrittlement, scaling and secondary (tramp) scale adhesion which in turn limits the temperatures to which these alloys may be used and limits the useful life expectancy of parts made from the alloys.

The $Ni_3Al$ based intermetallic alloy family yields significant improvements in the physical and mechanical properties available at elevated temperatures. These property improvements are to be found over a broad range of elevated temperatures (especially from 1400° F. to 2300° F.) and include enhanced strength and toughness, exceptional stability to oxidation, good hardness, thermodynamic stability and a single phase crystallography over the entire intended use range. In turn, these properties, over a broad temperature range, can provide the basis for parts which have unusually good dimensional stability, oxidation resistance, thermal shock resistance, thermal cycle fatigue resistance and wear resistance.

By the use of the $Ni_3Al$ based intermetallic alloy family one may produce parts for use at elevated temperatures which, in comparison to the ACI heat resistant casting alloys, will significantly reduce if not eliminate the aforementioned part deficiencies. The intention of producing such alloys then is to use them as the materials of construction for parts that will be used at elevated temperatures for the fabrication, processing and manufacture of steel.

DETAILED DESCRIPTION OF PREFERRED EMBODIMENTS

Figure 1:
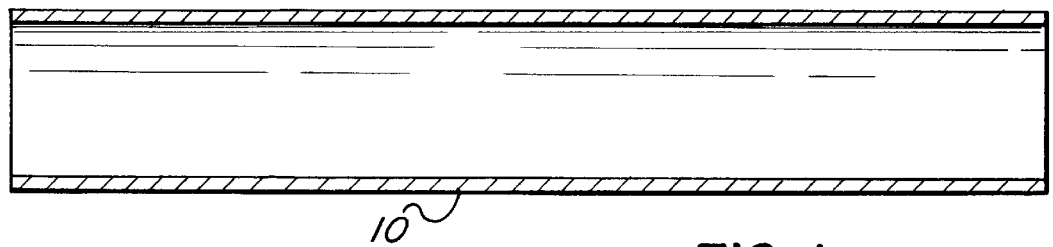
FIG. 1 is a sectional view of a mill roll of the present invention.

Described is a material handling apparatus for processing heated, formed ferrous metal products and/or hot glass products, comprising a face centered cubic crystal intermetallic alloy of metal aluminide having the property of withstanding repeated thermal cycling from ambient to about 1600° F. wherein the metal of the metal aluminide is selected from the group consisting of a Group VIII metal of the Periodic Table.

The Metallurgic Properties of the Intermetallic Alloys which Provide the Basis for the Manufacture of Parts which are useful to the Fabrication, Processing and Manufacture of Steel Products at Elevated Temperatures The nickel and aluminum alloy that is useful for the present invention is an intermetallic alloy. An intermetallic alloy is defined as an alloy of two or more metals which, like a chemical compound, has a distinctive crystallographic structure and definite composition or composition range.

The specific intermetallic alloy family of interest in this invention can be characterized as a face centered cubic crystal system wherein the majority of the metals which comprise the alloys are selected from the group containing nickel, a Group VIII metal, and aluminum. The specific intermetallic alloy used in a specific application may have additional, substitutional alloying elements which have been added to achieve a specific property profile. Typically, these substitutional elements will be selected from the Group III, IV, V, VI and VIII metals of the Periodic Table.

The Group III, IV, V, VI and VIII metals of the Periodic Table are depicted in HAWLEY'S CONDENSED CHEMICAL DICTIONARY, 11th Edition, published by Van Nostrand Reinhold [1987]. The inside cover is hereby incorporated by reference.

The substitutional elements that may be added are boron, titanium, zirconium, hafnium, vanadium, niobium, tantalum, chromium, molybdenum, tungsten, iron, cobalt and mixtures thereof and the like. Effective alloying amount may be used from about 0.001% to about 15% (by weight) of the intermetallic alloy.

The intermetallic alloy which is the foundation for all of the nickel aluminide alloys considered in this field of applications is composed of about 75 atom percent nickel and 25 atom percent aluminum with a small atom percent of boron added for ductility. More specifically, one attempts to maintain a ratio of 76 atom percent nickel and 24 atom percent aluminum with a minimum of 150 ppm of boron, even with any given intermetallic alloys wherein some of the nickel and some of the aluminum has been substituted by one or more of the aforementioned elements. These atoms of this intermetallic alloy in the aforementioned ratio combine to form a simple face centered cubic (FCC) crystal. In large part, many of the useful properties of this family of alloys are related to the fact that the large fraction percent of the constituents are of the single phase system which is this simple FCC crystal.

Within this crystal lattice, many other elements can be substituted for the nickel and aluminum atoms while retaining this single crystal phase as the large fraction. In this fashion, one can modify the properties of the basic alloy and thus design and fashion the alloy to better satisfy the demands of a specific industrial, operating environment. The above list depicts the variety of alloying elements that can be added. In the case of the nickel aluminide alloys, elemental substitutions are made to the extent that the single phase nature of the entire elemental consistency is retained in the main.

This single phase nature of the nickel aluminide alloys is important to their behavior at elevated temperatures.

The nickel aluminide alloys offer a new and novel combination of mechanical and physical properties that are especially well suited for industrial applications as parts used at elevated temperatures. Generally, these alloys show excellent performance at temperatures of 1200°–2300° F. Specifically, these intermetallic alloys can be designed to perform usefully and well in the areas of application where the historically available alloys have provided properties that result in part deficiency and failure in general and specific industrial applications when the operating temperatures increase beyond certain limits.

The Physical Property Profile of the Nickel Aluminide Alloys

Thermal Conductivity. The fundamental nickel aluminide alloy has a thermal conductivity twice that of the high performance alloys used in the manufacture of parts which are employed at high temperatures. Through substitutional alloying, one can generally match the thermal conductivity of these other alloys. Thus, one has the ability to manipulate the thermal conductivity and better design parts having a specific heat transfer capability.

Density. The basic nickel aluminide alloy is less dense than most of the competing, high performance alloys used at high temperatures. Thus, parts that have a satisfactory property performance profile can often be made with less material that is used with competing alloys.

Oxidation Resistance. The family of nickel aluminide alloys offer outstanding resistance to oxidation due to the aluminum content and the resulting alumina [$Al_2O_3$] based oxide film that forms on the surface. Further, by the substitutional alloying singularly, or in combination with chromium, zirconium, hafnium and molybdenum one can design alloys and parts having even better performance for specific applications. The oxidation resistance is extraordinary in that the alloys are stable to oxidation in air at temperatures up to 2300° F.

The alloys generally are protected from oxidation by the formation of an alumina (aluminum oxide ... $Al_2O_3$) surface film that is both adherent and coherent to the alloy under a variety of operation conditions. With alloying, this oxide film becomes a complex oxide, but the major constituent is based on alumina. These oxide films are unusually tenacious and resists spalling at elevated temperatures and under conditions of thermal cycling and mechanical abuse.

Additionally, these alloys have an advantage due to their single phase nature which provides a uniform coefficient of thermal expansion to the alloy and parts made therefrom. Hence, approximately all of the intermetallic alloy grains within a part have the same coefficient of thermal expansion, and the surface of the part moves in unison. And, hence the protective oxide film is not disrupted. In contrast, most alloys used at elevated temperatures consist of multiple phases, typically three or more. Each phase of a multiple phase metal system has a different coefficient of thermal expansion. At the surface of a part made from such a multiple phase alloy, under the conditions of elevated and/or fluctuating elevated temperatures the differences in thermal expansion of the multiplicity of phases can lead to rupture of its protective oxide film. Hence, such alloys are more prone to higher rates of oxidation due to this mechanism.

Further, the strengthening phases is some multiple phase alloy systems are subject to a disruptive oxidation process within a given phase. For example, carbide precipitants can oxidize at high rates at elevated temperatures which again disrupt the protective nature of the oxide surface film, again leading to high rates of oxidation due to this mechanism. By contrast, the intermetallic alloys envisioned herein do not subject to this oxidation failure mechanism.

In addition, some of the alloys historically used contain significant percentages of niobium and/or tungsten. Under specific conditions of fluctuating elevated temperatures, these alloy constituents can be concentrated within the body of a part which, in turn, can lead to significant degrees of internal oxidation within parts made from these alloys, providing yet another mechanism of part failure. By contrast, the intermetallic alloys envisioned herein do not use these elements in the alloy and hence are not subject to this oxidation failure mechanism.

Thus, parts which must perform under unusually severe conditions of being heated in air to temperatures up to 2300° F. can be considered for applications by using nickel aluminide based intermetallic alloys. And, parts made from such intermetallic alloys can be expected to outperform competitive alloys.

Wear Resistance. The family of nickel aluminide alloys offer a wear resistance that is competitive to the other high performance alloys used in the fabrication of parts where they are utilized at high temperatures. Generally, the abrasive wear resistance of a given alloy parallels its strength behavior and the tenacity of the protective surface oxide film. The nickel aluminide alloys provide greater strength at elevated temperatures than competitive commercial alloys, especially at temperatures in excess of 1500° F. and as has been discussed, the protective oxide layer that is formed on the nickel aluminide alloys is based on alumina ($AL_2O_3$), and these films are tenaciously adherent and coherent. Hence, one may generally anticipate that parts made from the nickel aluminide alloys are competitively wear resistance.

With this combination of high temperature strength and tenacious and hard oxide surface film, one finds that parts made from these alloys are usefully resistant to abrasive wear at elevated temperatures, and such parts will often outperform competitive alloys.

Resistance To Carburization. Nickel and aluminum do not form stable metal carbides with carbon. Hence, the fundamental nickel aluminide intermetallic alloy is resistant to the chemical action of carbon at elevated temperatures. The intermetallic alloys envisioned in these applications do not contain substitutional alloying elements that are particularly chemically affected by the presence of carbon at elevated temperatures. Further, the adherent and coherent alumina based oxide surface layer on parts, that has been discussed previously, also provides protection from the diffusion of carbon to the alloying constituents of any given intermetallic alloy.

By contrast, one notes that the iron based alloys which are commonly used for part fabrication and application at elevated temperatures react with carbon. Iron carbide ($Fe_3C$) is readily formed between carbon and iron and it is a well known and stable compound. As the operating temperature of any given part is increased, the opportunity for carbon diffusion into any given part is increased. Thus, one finds that parts made from iron based alloys become embrittled and fail with time if they are exposed to a carbon rich environment.

Thus, parts which must perform with carbon rich operating conditions at temperatures up to 2300° F. can be considered for applications using nickel aluminide alloys. Since parts made from the nickel aluminide alloys do not fail by in-situ carbide formation, one can expect such intermetallic alloys to outperform many of the commercial competitive alloys used to make industrial parts which are used in carbon rich, high temperature environments.

The Mechanical Property Profile of the Nickel Aluminide Alloys

Strength. Generally the strength of the nickel aluminide family is high and is significantly better than most commercial alloys at elevated temperatures. Further, the nickel aluminide alloys compare favorably with those special for alloys designed and designated for high performance (i.e. superalloys) used in parts employed at elevated temperatures (see attached graph).

The basic nickel aluminide alloy increases in strength with increasing temperature up to about 1250° F. and though it declines in strength with further increases in temperature, it retains useful strength to 2300° F. Especially from 1700° F. to 2200° F. this alloy family provides higher strengths than almost all alternative metallurgies and higher strengths than any commercially competitive alloys.

The strength behavior of these nickel aluminide based alloys can be significantly modified by the means of substitutional alloying with the elements mentioned earlier in this text. Thus one can, for example, design an alloy which maintains a high but level strength performance profile through 1700° F. and further is stronger than alternative materials through 2200°–2300° F.

Generally then, one finds that nickel aluminide alloys have a useful niche strength advantage in the temperature range of 1400°–2300° F. permitting one to manufacture parts which will provide useful structural integrity at elevated temperatures.

Toughness. The toughness of an alloy is generally the result of the interrelationship between the strength and the elongation of the specific alloy. The basic nickel aluminide alloy demonstrates a useful elongation through moderately elevated temperatures, but shows a significant decline in the elongation of the material when the temperature has reached 1250° F. . . . and hence the alloy has lost much of its toughness. However, by substitutional alloying, this loss can be eliminated and useful elongations and toughness values are available for a range of nickel aluminide alloys. Hence, in this fashion tough alloys can be designed and fabricated into parts which prove a superior and useful performance and elevated temperatures. And, alloys can be designed which can outperform many of the competitive metals and alloys.

Thermal Cycle Fatigue Resistance. Generally, the resistance to mechanical failure associated with extremes in thermal cycling is excellent for the nickel aluminide alloy family. This characteristic can be generally associated with the high strength and toughness of the alloy at elevated temperatures.

In addition to these factors, the single phase nature of the metallurgy of the nickel aluminide alloys aides in providing for superior thermal cycle fatigue resistance. Most high performance alloys which are available and used at elevated temperatures are multiple phase alloys. The difference in strengths within each of the phases, the differences in bond strength between the phases compared to the primary grain bond strength, and the differences in the coefficient of thermal expansion over a range in temperature can all combine to provide the basis for a decline in the resistance to fatigue failure of parts due to thermal cycling. The nickel aluminide alloys envisioned in this invention are approximately a single phase material of high strength and toughness and are not subject to part failure due to these types of fatigue mechanisms and are not thusly affected.

Hence, one finds that the nickel aluminide alloys are not as prone to the thermal cycling fatigue and the resulting thermally induced cracking phenomenon which is known in the trade as hot checking, fire checking and similar names which reflect this deficiency in mechanical property. Therefore, where the maintenance of structural integrity of a part is important and/or the maintenance of the surface integrity of a part is important, the nickel aluminide alloy family can outperform competitive alloys.

Load Cycle Fatigue Resistance. The nickel aluminide alloys have good resistance to fatigue failure due to structural loads that are applied to parts in a cyclic fashion. Generally, the resistance to load cycle fatigue is related to the strength and the toughness of an alloy at any given temperature. Since nickel aluminide alloys demonstrate good performance in these values at any given temperature, they also provide the basics for parts which show good load cycle fatigue resistance.

Again, the single phase nature of the nickel aluminide family of alloys provides an advantage over multiple phase alloys in load cycle fatigue resistance. The reason for this is similar and related to the advantages depicted in the section concerning thermal cycle fatigue resistance. A high strength/toughness, homogenous alloy will outperform a similar valued strength/toughness, multiple phase alloy at any given elevated temperatures of operation.

Further, at temperatures above 1400° F., the nickel aluminide alloys can be designed to be stronger and tougher, and hence, parts can be fabricated which will provide a useful load cycle fatigue resistance which is superior to most commercial alloy parts.

The Useful Application of Nickel Aluminide Alloys as Tooling, Fixturing and Components for the Fabrication, Processing and Manufacture of Steel Products at Elevated Temperatures Steel is one of the earliest thermoplastic materials known to man and typically steel is most often processed hot. Depending upon the specific process involved, the temperature at which solid steel is processed, fabricated and manufactured into parts may range from 1200° F. to 2300° F. Hence the tooling, fixturing and components used in the processing of hot steel must be strong and tough plus be able to withstand static and cyclic structural loads. In addition, such steel processing parts must withstand severe thermal shock, severe thermal cycles, oxidation and scaling, abrasive wear, carburization, and be thermodynamically and dimensionally stable. All of these property characteristics must be available in parts that will function over a wide range of operating temperatures.

The commonly used, historical alloys that have been available for the processing of solid hot steel involve combinations of iron, chromium and nickel. The properties available from the alloys using these elements typically are augmented by the use of carbon, niobium, tungsten and zirconium as well as other minor elemental constituents. The major heat resistant alloy families which are commonly available for the manufacture of cast tooling, fixturing and components for hot solid steel processing are the ASTM designation A-297-67 series of iron-chromium and iron-chromium-nickel alloys.

In the consideration and selection of the alloys which are to be used for high performance parts for steel processing applications at elevated temperatures, one focuses on the following properties:

a). strength and toughness;
b). the resistance to oxidation;
c). the resistance to carburization;
d). the resistance to scaling;
e). the resistance to abrasive wear;
f). the thermodynamic and dimensional stability of the metallurgical phases;
g). the resistance to thermal cycle fatigue failure; and
h). the resistance to load and load cycle fatigue failure.

The tooling, fixturing, and components that are required for the processing of hot, solid steel are typically associated with the following unit operations:

a). Heating of the primary steel shape prior to forming the steel into another shape, which may include heating of the blooms, slabs, billets, plates, rails, bars, wheels, axles, wire, rods, tubulars, strip sheet and the like;
b). Modification of the primary metallurgical state of any given steel alloy which may include annealing, normalizing, hardening, temperic, carburizing, nitruding, grain refining, zone refining and the like.

In many cases, one is concerned with the components required to physically transfer the hot solid steel object from place to place and tooling which provide for the modification of the shape and condition of the hot solid steel object which may involve: extractors, slab heating/reheating furnace rolls, transfer rolls, scale breaker rolls, broadside mill rolls, hot slab shears and edgers, roughing mill rolls, slab reducer rolls, crop end shears, finishing rolls, hot saws, skelp rolls, seamless pipe piercing and drawing equipment; transfer troughs; rotary rolls roll guides; extrusion dies and equipment; and many other such components and pieces of tooling which permit one to handle, transfer and manipulate hot solid steel.

Further, in the heating and reheating of solid steel objects, one is especially concerned with the requisite furnaces and all of the fixturing and components which may include:

carburization furnaces requiring furnace tubes, rolls and structural fixtures;
slab heating furnaces requiring rolls and structural fixtures;
hot strip mills requiring rolls and structural fixtures;
hot rod mills requiring rolls, guides and structural fixtures; and
heat treating furnaces which may require rolls and structural fixtures and be of the batch type (box, car bottom, bell, pit and pot furnaces) and of the continuous type (rotary hearth, roller hearth, pusher, conveyor, walking beam, tunnel, continuous strand, and overhead monorail).

The historically available iron-chromium and iron-chromium-nickel family of alloys (ASTM designation A 297-67) are commonly used in most of these applications. However, in many instances the properties available with and inherent to these alloys and their derivatives lead to the eventual failure of the parts (tooling, fixtures and components) manufactured from these alloys. The modes of part failure can be seen as follows:

Strength and toughness that becomes increasingly deficient beyond 1500° F., which results in dimensional distortion of parts used in processing and part surface softness which permits scale and slag to be embedded in the part surfaces which are detrimental to the quality of the steel being processed.

Oxidation and scaling resistance that becomes increasingly deficient beyond 1500° F., which leads to abrasive wear and erosion of parts used in processing plus the build-up of scale which becomes detrimental to the quality of the steel being processed.

Carburization resistance that becomes increasingly deficient beyond 1400° F., which leads to the embrittlement of parts used in the processing and eventual failure by cracking and breaking.

Lack of thermodynamic stability of the alloy system which leads to oxidation and scaling, dimensional instability and a reduction in fatigue life of parts used in processing.

Abrasive wear resistance that becomes increasingly deficient beyond 1500° F., since the strength is decreasing rapidly and the oxidation rate is increasing one finds that the abrasive and erosive wear rate increases leading to the failure of the part used in processing.

Heat Treatment Furnace Rolls as an Example of the Application of Nickel Aluminide Alloys Versus those of the ASTM A-197-67 Iron-Chromium-Nickel Alloy Family The nickel aluminide alloy family can be seen to provide a superior mechanical and physical property profile in comparison to those of the commonly used, commercially available alloys as derived from the ACI heat resistant casting alloy HP (within the ASTM designation A-297-67) and modified with niobium, tungsten and/or zirconium for better strength, better oxidation resistance and reduced scaling. Hence, parts made from nickel aluminide alloys will have better performance in steel processing than will identical parts made from the modified HP iron-chromium-nickel alloy.

Specifically, as an example, we compare heat treatment furnace rolls which have been made from a specific nickel aluminide alloy and from a specific modified HP alloy as used in the normal operating temperatures and with the normal operating loads employed in the heat treatment of steel slabs. These comparisons are made as follows:

Strength and Toughness. The nickel aluminide alloys are stronger and tougher than the modified HP alloys from room temperature up to the maximum operating temperature of 1800° F.

Above 1500° F., furnace rolls made of nickel aluminide alloys will be significantly stronger than those made of the modified HP alloy. As the furnace operating temperature increases, this strength difference becomes more significant. The furnace roll made from the modified HP alloy will eventually fail structurally where the furnace roll made from the nickel aluminide alloy will not. In addition, since the nickel aluminide alloy is significantly stronger, less material need be employed so as to provide the same structural performance at any given temperature.

Oxidation Resistance. The resistance to oxidation and scaling of furnace rolls made from the nickel aluminide alloys are equal to or more resistant than parts made from the modified HP, commercial alloys.

Most of the metallurgies which compete with nickel aluminide alloys for high temperature applications depend upon having a high chromium content. In turn, parts made from such alloys are oxidation resistant because of the formation of chromia ($Cr_2O_3$) on the surface of the part. Generally, in the high chromium content alloys, the chromia oxide film is adherent and coherent and thus provides the protection. Hence, the modified HP alloy furnace roll contains 24–28% (by weight) chromium. However, at increasingly high temperatures, the chromia has an appreciable vapor pressure and there is a continual depletion of chromium from the furnace roll surface and hence an enhanced oxidation rate occurs leading to an accelerating deterioration of the parts made of these alloys. Above 1500° F., nickel aluminide alloys are more resistant to oxidation than alloys that depend upon chromium as their major source of oxidation resistance.

In addition, at elevated temperatures it appears that the oxide films which are generated on the surface of parts made from nickel aluminide alloys are more tenacious than the oxide films based on chromium.

As the steel processing temperatures increase above 1500° F., the nickel aluminide alloy furnace rolls do not oxidize, scale, deteriorate nor degrade as rapidly as furnace rolls made of modified HP alloys. With increasing temperatures, the life expectancy of furnace rolls made of nickel aluminide alloys increases significantly over those of rolls made of modified HP alloys. For steel slab heat treating furnaces, the typical operating temperatures range from 1600° F. to 1800° F.

A Comparison of the Thermodynamic Stability of the Metallurgical Phases Involved with Nickel Aluminide Alloys and Modified HP Alloys The single phase nature of the nickel aluminide metallurgy is a reflection of its thermodynamic stability.

The commonly employed commercial alloys are generally not thermodynamically stable in many of the steel processing operations. As noted, many of the iron based alloys used commonly have a high chromium alloy content is employed. At elevated temperatures (between 900° and 1500° F.) and with time, the chromium diffuses through the part and forms a chromium-iron intermetallic alloy that is brittle. This chromium-iron phase is known as sigma phase, and the concentration within a given part is related to the relative concentrations of iron and chromium, the operating temperature of the part, and the amount of time that the part is held between 900° and 1500° F.

For example, though a furnace roll is used in a heat treatment furnace which nominally operates at 1600° F., toward the ends of the furnace roll there are large masses of the metal which reside within the 900°–1500° F. temperature range for significant periods of time. Also, during shut-down and start-up of the furnace, the rolls again will spend significant periods of time at the critical temperature range. And further, once the chromium-iron intermetallic alloy is formed, the reverse diffusion does not take place with the same velocity leaving the part vulnerable to the formation of the sigma phase.

The structural integrity of a part is dependent upon the concentration of the sigma phase in any one zone and in the entire part. The sigma phase embrittles the part and sets the stage for failure of the part due to cracking.

In addition to the formation of sigma phase, one must be concerned with carbide compound formation as such compounds can also embrittle a part. The heat resistant alloys use carbon as a strengthening agent. With time at temperature carbon can diffuse and can concentrate as large carbide particles, a brittle secondary phase, which can lead to part embrittlement and cracking.

Many of the nickel aluminide alloys do contain chromium but in general iron is not used as a substitutional element, hence sigma phase chromium-iron cannot be formed. In addition, the nickel aluminide alloys do not carburize nor are they formulated with carbon. Hence parts made from the nickel aluminide alloys envisioned for use in the processing of hot solid steel are not subject to the modes of failure which are inherent to the commonly used heat resistant iron-—chromium-nickel alloys.

A Comparison of the Resistance to Scale Formation between the Nickel Aluminide Alloys and the Heat Resistant Iron-Chromium-Nickel Alloys Generally, the nickel aluminide alloys will be more resistant to scale formation, its loss by thermal spalling and its loss by mechanical abrasion due to the adherent and coherent surface film based on aluminum oxide which is formed on parts made of these alloys.

As discussed in the previous portion of this invention, the nickel aluminide alloys form a coherent and adherent oxide film. Once formed, the amount of this surface film tends to be fixed at any given temperature. Hence, this alloy family will not be seen to form significant additions to the initial protective oxide film, and hence the tendency toward scaling is minimized.

The historical, commonly used alloys based on iron-chromium and iron-chromium-nickel form chromium oxide (chromia: $Cr_2O_3$) as the basic surface oxide film which provides excellent protection against scale formation. The entire stainless steel alloy family attests to the stable protective oxide which is formed. But as the temperature is increased, the quality of this protection deteriorates as the chromia becomes unstable and the oxidation and scaling rate increases when parts made of these alloys are exposed to air beyond 1500° F. Hence, one finds that above 1500° F., the alumina based oxide protective film on the surface of parts made from nickel aluminide alloys outperform the iron-chromium and iron-chromium-nickel based heat resistant alloys.

In addition, there is another consideration to take into account with regard to the presence of scale which is based on iron oxide.

In the typical heat treatment furnace operations, temperatures range from 1500° F. to 1800° F. and as the firing is done in air everything within the furnace is exposed to an aggressively oxidizing environment. Iron oxide scale is formed on the steel objects that are being heat treated as well as on the furnace fixturing and any iron based alloy that is within the furnace. This iron oxide scale accumulates within the volume of the furnace and creates problems in maintenance of the furnace and in the surface quality of the steel object being manufactured.

For example, within the typical heat treat furnace, the volume of iron oxide scale is formed on the steel slabs that are being heat treated as well as on the furnace rolls and the structural members of the furnace proper. With heat treat furnace rolls made of the iron-chromium and iron-chromium-nickel based alloys, one finds that the strength of these alloys has sharply declined and the surface of these rolls has become relatively soft. In turn, when these furnace rolls bear the weight of the steel slab, the hard, ceramic-like iron oxide scale which is on the steel slab and within the furnace can become "ground into" the surface of the furnace rolls. Then in the heat treatment of subsequent steel slabs, the surface of the steel slab is exposed to the now rough surface of the furnace roll and the slab surface can be gouged and marred. In practice, this disfiguration of the surface of the slab creates off-grade products from commercial items that are produced from such steel slabs.

In contrast to the iron-chromium and iron-chromium-nickel based alloy furnace rolls, nickel aluminide alloy furnace rolls will have 6–10 times the strength at the typical heat treat furnace operating conditions. Hence, the surface of the nickel aluminide based rolls will not be soft and the iron oxide scale within the furnace will not be "ground into" the surface of the roll during operations. The result of these considerations will be that the nickel aluminide alloys based furnace rolls will have a less abrasive surface and thus will provide a better quality finish on the steel object (e.g. slab) being processed.

A Comparison of the Resistance to Abrasive Wear between Parts made of Nickel Aluminide Alloys and those made of Iron-Chromium, Iron-Chromium-Nickel Alloys, And Other Commonly Used Heat Resistant Alloys The resistance to abrasive wear between metal parts is related to the type of oxide that forms on the surface, the strength of the alloy that supports that surface oxide, the roughness of the surface of the alloy part, the temperature at which abrasion takes place . . . and the nature of the object that is inducing the abrasion (its surface roughness, type of protective film, chemical reactivity between the object and the other alloy) as well as the amount and type of forces (relatively static versus dynamic and/or cyclic) that bring the objects together. This tribology is complex.

However, in general, it may be noted that the amount of abrasive wear between two metal objects at any given temperature can be roughly related to the nature of the protective film and the strength of the alloys involved all other factors being equal.

With the iron-chromium, iron-chromium-nickel and other chrome bearing alloys we have noted that the protective oxide film begins to deteriorate at temperatures above 1500° F., and that the strength of these alloys has been significantly reduced. These factors point to a general decrease in abrasive wear resistance for objects made from these alloys.

On the other hand, nickel aluminide alloys possess a tenacious, protective, alumina based surface film and have a comparatively high strength at elevated temperatures such as above 1500° F.

Hence, one finds that parts made from nickel aluminide alloys are capable of withstanding abrasive wear better than parts made from iron-chromium, iron-chromium-nickel, and other such alloys. More specifically, well prepared furnace rolls made of nickel aluminide alloys will be less affected by the action of abrasive wear due to steel slab transport than will well prepared furnace rolls made of iron-chromium and iron-chromium-nickel.

A Comparison of the Resistance to Thermal Cycle Fatigue, Load Bearing Fatigue and Creep between parts made of Nickel Aluminide Alloys and Iron-Chromium Based, Iron-Chromium-Nickel Based and other commonly used Heat Resistant Alloys Generally, parts used in the processing, fabrication and manufacturing of hot solid steel are subject to extremes in temperatures and to a wide range in loads. Deficiencies in the resistance to these variable forces lead to significant limitations in the useful life of such parts.

The capacity of a part to withstand the forces that lead to fatigue failure are fundamentally related to the mechanical properties of the alloys employed, the magnitude properties of the alloys employed, the magnitude of the forces variation of these forces. The resistance to these forces depends upon several factors, such as alloy strength, intergranular bond strength, thermal conductivities of phases, coefficients of thermal expansion, grain size, type-volume and morphology of secondary phases, the average operating time temperature of the part, the extremes in the time temperatures to which the part is exposed, the average operating time-load imposed on the part, and the extremes in the time-load imposed on the part.

The iron-chromium, iron-chromium-nickel, and other commonly employed heat resistant alloys are of lower strength and toughness than the nickel aluminide alloys over the entire range of use temperatures. And, as we have pointed out, nickel aluminide is basically a single phase material whereas the other alloys commonly used are multiple phase in nature. Thus, with all other factors being equal in the preparation of tooling, fixtures and components, nickel aluminide parts will outperform parts made of these other alloys in terms of creep and fatigue, whether it be heat or load induced.

A Comparison of the Resistance to Carburization between parts made from Nickel Aluminide Alloys and Parts made from Iron-Chromium, Iron-Chromium-Nickel, and other commonly used Heat Resistant Alloys Often, parts that are made from hot solid steel are exposed to atmospheres that are rich in carbon. In some cases, this will be intentional and intense, such as occurs in furnaces that are designed to carburize the steel parts so as to achieve hardness, strength and wear resistance of the specific part. In other cases, this carbonization will occur because of the use of unit operation related oils, greases and other sources of hydrocarbons. In like fashion, the parts used as the tooling, fixtures and components which are involved in such unit operations are also exposed to the carburization and its effects.

Parts made from iron based alloys can be carburized, whereby $FE_3C$ is formed. The rate at which such parts are carburized is related to the other alloying constituents within the part, the amount of carbon to which the surface of a part is exposed, the temperature during the exposure to carbon, and the amount of time to which the part is exposed to carbon. And, the amount of carbonization within a part is accumulative. Further, at some point in the carburization of a part, the amount of $FE_3C$ embrittles the part, cracks occur and structural failure of the part takes place.

Parts made from the iron-chromium, iron-chromium-nickel alloys and other such iron based heat resistant alloys are subject to embrittlement due to carburization. All other things being equal, with alloying constituents the rate at which such parts are carburized can be reduced, but with time parts made from such alloys will embrittle.

Parts made from the nickel aluminide alloys resist carburization. Both nickel and aluminum do not form stable carbides. And, whereas some of the alloying ingredients do form stable carbides, such compound formation does not lead to massive part embrittlement. Generally, the stable carbide forming elements used in alloying are of a low concentration and further the protective alumina based oxide surface film essentially eliminates the diffusion of carbon into the bulk of the part.

Hence, one expects that parts made from nickel aluminide based alloys will not embrittle and will outlast parts made from heat resistant alloys that contain iron. Specifically, tube furnaces are used in the carburization of steel parts. The fixturing and components of such carburization furnaces are accumulatively exposed to carbon rich environments for prolonged times at temperatures that may range from 1500° to 1900° F. Under these conditions the tubes, which are typically made from iron-chromium-nickel based alloys fail by cracking and structural failure which is induced by gross carburization of the tube. However, fixturing and components used in carburization furnaces made from nickel aluminide alloys will not fail due to carburization of the parts.

In general, the metal aluminide of this invention can be fabricated by centrifugal casting, whether vertical or horizontal or hot isostatic processing utilizing known techniques. Tabulated below are various manufacturing considerations in preparing the alloys of this invention.

Feed Stock

In general, the nickel aluminide alloy selected such as for the roll application is simple. One may utilize the availability of 713LC hard scrap plus Ni$_3$Al ingot stock for the manufacture of these nickel aluminide alloy centrifugally cast rolls.

The nominal composition (as weight %) of the feed stock alloys and the preferred alloy are as follows:

|  | 713LC | NI3AL | Preferred Alloy |
|---|---|---|---|
| Nickel | 74.0 | 87.3 | 79.4 |
| Aluminum | 6.0 | 12.7 | 8.5 |
| Chromium | 12.5 | 0 | 8.0 |
| Molybdenum | 4.2 | 0 | 3.0 |
| Zirconium | 0.1 | 0 | 0.85 |
| Boron | 0.012 | 0.05 | 0.005 |
| Niobium | 2.0 | 0 | [0]* |
| Titanium | 0.6 | 0 | [0]* |

*Note: Although niobium and titanium are not required for the preferred alloy, the amounts from the 713LC alloy, the final alloy product's properties are not harmed by their presence in the adjusted levels.

*Note: Although niobium and titanium are not required for the preferred alloy, the amounts from the 713LC alloy, the final alloy product's properties are not harmed by their presence in the adjusted levels.

The 713LC and the Ni$_3$Al feed stocks will be used in a ratio of approximately 2:1, with final adjustments in chemistry being made at the ladle.

The preferred alloy for boron additions is NiB although other alkali metal or alkaline earth metals could be utilized.

Furnace Considerations

Nickel aluminide and the feed stocks are readily melted by induction heating techniques. In the melt, the final alloy is protected from massive oxidation by the formation of a skull of alumina Al$_2$O$_3$, which protects the body of the melt stock. However, an argon blanket is to be used at all times to protect the melt from excessive oxidation.

Furnace lining: any of the normally MgO used ceramic linings will be satisfactory. These include Al$_2$O$_3$, MgO and Zr$_2$O$_3$. We would like to minimize contamination from iron and silicon as these lower the high temperatures strength of the alloy.

Protective blanket: to the extent possible, the nickel aluminide melt should be protected from excessive oxidation by the use of argon. A blanket of argon is easily provided by the use of liquid or gas.

Superheat: prior to pouring the temperature of the melt may be 2850°–2950° F. (the melting pint of the preferred alloy is about 2550°).

Composition control: prior to casting the alloy, the ladle melt chemistry is analyzed so as to be in specifications.

Trunion Casting

General comments: nickel aluminide is heated to 2900°–3000° F. to pour and fill the mold correctly. And, to avoid excess oxidation, the use of an inert gas blanket on the furnace is required.

Mold gates and runners: standard commercial practice will produce satisfactory results, albeit the tops should be generous and allow for an additional 5% shrinkage.

Hot topping: it is recommended that hot topping practice be followed to permit a good fill utilizing commercially available materials.

Mold wash: one may use a silica base mold release agent generally available commercially.

Cast gates and runners may be cut off by standard torch practice and recycled.

Surface finish apparatus: used as is.

Centrifugal Casting

If the nickel aluminide alloy is not heated sufficiently, the melt pours somewhat erratically, rather "goopy." However, with a proper superheat as outlined above, the alloy pours well and flows to fill the mold properly. Again, excessive oxidation is avoided by the use of inert gas which is lanced into the mold prior to the pour.

Mold release agent: a standard SiO$_2$ based mold release agent can be used with nickel aluminide centrifugal castings. This is applied via a standard wash/lance practice. However, the wash carrier water should be completely removed from within the mold prior to casing. An alumina based mold release agent would be preferable, but the water of hydration is more difficult to remove. Any water on the mold wall ruins the surface of the cast tube.

Mold preheat: the standard practice of mold preheat should be used with a preheat temperature of 350°–400° F.

Protective blanket: to prevent excessive oxidation of the nickel aluminide tube's inner volume of the mold cavity should be flushed with nitrogen or argon prior to casting the melt.

Cast tube surface: the o.d. of the nickel aluminide tube will faithfully reflect the washed mold surface. When the mold preparation is correctly done, standard practice will produce a satisfactory roll surface, which will require no further work.

Alloy Composition

The properties of the nickel aluminide alloys are defined by the specific alloy chemistry. Each alloy may be designed to produce a single phase (gamma prime) structure. The primary properties are defined by the ratio of the nickel to aluminum (76:24 atomic percent) and the preferred 200 ppm boron content. The other elements are added substitutionally so as to achieve a specific type of proper response for a specific end use, such as better oxidation resistance, better fatigue resistance, a specific strength versus operation temperature response and the like.

As measured in situ of the nickel aluminide: Aluminum: this element could range from 6 to 14 percent depending upon the feedstock and other alloys to be considered. The aluminum content may be judged incorrectly and significantly low if one uses the standard X-ray spectroscopy standards. Significant amounts of aluminum are typically not lost in the melting, casting, and recycle of this alloy.

Chromium: this element could range from 6 to 10 percent.
Molybdenum: this element could range from 2–4 percent.
Zirconium: this element could range from 0 to 1.5 percent.

Boron: this element preferably is present at the minimum threshold of 200 ppm, and can be up to 1000 ppm with no adverse effects of the alloy behavior.

TABLE I

| Alloying Effects With Aluminides | | |
|---|---|---|
| Alloying Element | Effect* | Mechanism |
| Boron | Ductilizer | Grain Boundary Morphology |
| Chromium, Silicon, Manganese, Titanium, Nickel | Creep Strengtheners | Solid solubility |
| Hafnium, Columbium Tantalum, Tungsten | Creep Strengtheners | Precipitation |
| Zirconium | Creep Strengtheners | Diffusion |
| Chromium | Oxidation Improvement | Protective Film |

| Nominal Composition (As Weight Percent) For Preferred Composition | |
|---|---|
| Nickel | 79.4 +/− 0.5 |
| Aluminum | 8.0 to 8.5 |
| Chromium | 7.5 to 8.0 |
| Molybdenum | 2.9 to 3.2 |
| Zirconium | 0.6 to 0.9 |
| Boron | 200 to 500 ppm |

(*Effects Most Aluminides)

Assembly

The heat treat furnace rolls are to be assembled from five components: a centrifugally cast roll, two cast trunions and two shaft pieces. The assembly concept is meant to be simple, but the assembly weldments of the nickel aluminide alloy should not bear the weight of the anticipated load. Rather, one may use mechanically stepped fittings whereby the weldments simply secure the maintenance of the wholeness.

Machining of the rolls: the end of each roll is to be machined lightly so as to accept the circumferential step fit of the trunion. This machining can be accomplished with carbide tooling and cutting fluid.

Machining of the trunions: the large bell end of the trunion is to be lightly machined with a step on the circumference. This step is to permit the trunion to be press-fit to the roll. The small end of the trunion is to be fitted with a premachined shaft via a press fit.

Machining of the shafts: the shafts are to be made of an HK alloy and provided with key-ways and such other details as required for the drive and bearing assembly.

Joining the trunions to the shafts: this can be made using Hastelloy W or the like.

Joining the trunions to the roll body: this is to be made using standard A.C. TIG practices; including the use of argon to protect the weld.

Nickel aluminide alloys may crack in the HAZ during welding. Oak Ridge National Laboratories are developing weld rods which should minimize the cracking.

Figure 2:
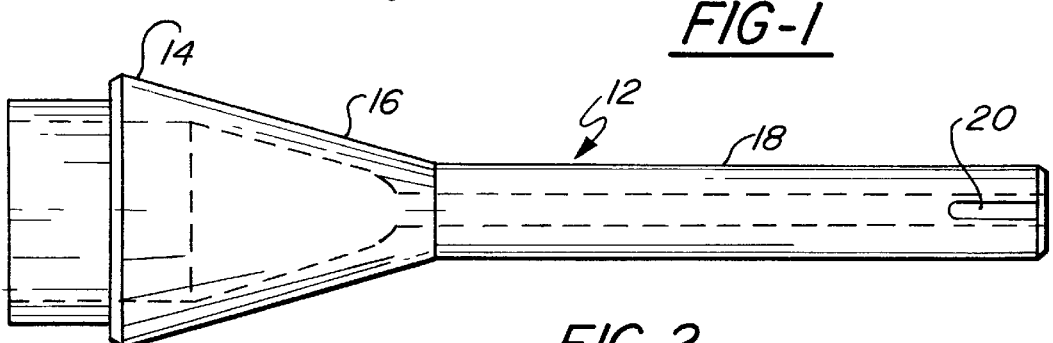
FIG. 2 is a trunion used in conjunction with the mill roll of FIG. 1.

Turning now to the drawings, FIG. 1 is a side sectional view of the roll that is utilized in the present invention. The length can be any desired length from 10 inches to 120 inches, preferably 50–100 inches, and even more preferably about 60–80 inches. They are generally utilized in conjunction with normal operating conditions in the casting of ferrous materials or glass manufacturing operations. The roll 10 is fitted to a pair of trunions 12 shown in FIG. 2. The beveled end 14 of the trunion is welded to the roll cylinder 10. The trunion has a frustoconical section 16 which is attached to a major horizontal segment 18 having a keyway 20 which locks the trunion in conjunction with the mechanism (not shown) for rotating the trunion and the roll.

Figure 3:
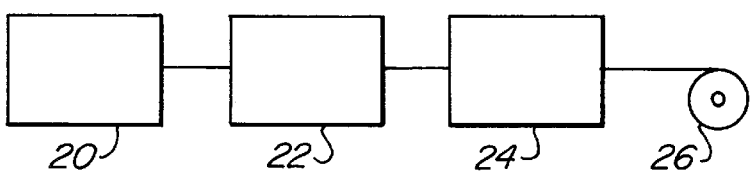
FIG. 3 is a schematic diagram of a casting process used in the ferrous steel metal industry.
Figure 4:
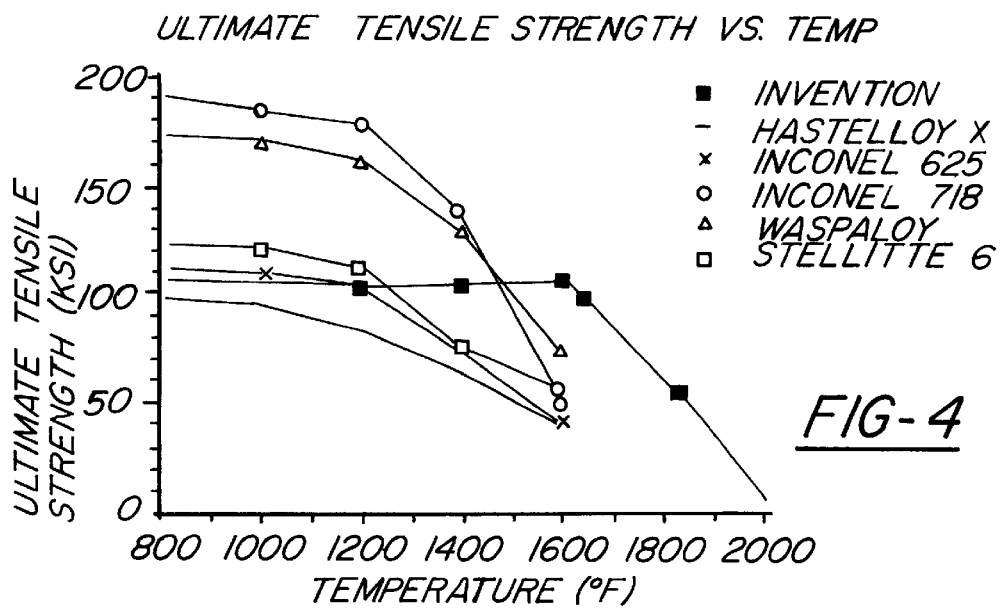
FIG. 4 is a graph plotting ultimate tensile strength of alloys used in the present invention versus temperature.

The roll 10 is used in conjunction with manufacturing operations of ferrous or glass manufacturing facilities. FIG. 3 schematically shows the operation where a melt 20 is prepared. The melt is then, through various processing steps, supplied to a continuous casting machine schematically shown as 22. There the melt is formed into widths of varying amounts as desired. Thereafter, the slabs are treated in subsequent processing steps schematically shown as 24 with a take-up roll shown as 26. Obviously, in glass manufacturing processes, the roll would be substituted with a take-up table for inspecting and removing the formed glass. The roll of the present invention is utilized in the handling operation generally shown as 22.

A general discussion of ferrous metal casting is disclosed in "Iron Age" 10/91, pp. 20–23, hereby incorporated by reference. A general discussion of continuous glass manufacturing is disclosed in "The Handbook Of Glass Manufacture" by F. R. Tooley, Vol. II, pp. 689–708 (1974), hereby incorporated by reference.

While applicant has described preferred embodiments, listed below are exemplifications of the invention wherein all parts are parts by weight and all temperatures are degrees Fahrenheit unless otherwise indicated.

EXAMPLE 1

To determine the ultimate tensile strength of the invention herein, applicant has prepared different formulations and measured the ultimate tensile strength of each sample at different temperature in degrees Fahrenheit (see Table II).

TABLE II

| Temp., °F. | Invention[1] | Hastelloy X[2] | Inconel 625[3] |
|---|---|---|---|
| 77 | 115.9 | 114.0 | 208.0 |
| 1000 |  | 94.0 | 108.0 |
| 1200 | 135.0 | 83.0 | 103.0 |
| 1380 | 125.5 | — | — |
| 1400 |  | 63.0 | 73.0 |
| 1560 | 119.1 | — | — |
| 1600 |  | 37.0 | 41.0 |
| 1650 | 103.9 | — | — |
| 1830 | 65.0 | — | — |

| Temp., °F. | Inconel 718[4] | Waspaloy[5] | Stellite 6[6] |
|---|---|---|---|
| 77 | 208.0 | 185.0 | 130.0 |
| 1000 | 185.0 | 170.0 | 120.0 |
| 1200 | 178.0 | 162.0 | 111.0 |
| 1380 | — | — | — |
| 1400 | 138.0 | 129.0 | 75.0 |
| 1560 | — | — | — |
| 1600 | 49.0 | 74.0 | 56.0 |
| 1650 | — | — | — |

TABLE II-continued

| 1830 | — | — | — |

[1]Invention
[2]Trademark of Cabot Corporation for high strength nickel base, corrosion resistant alloys.
[3]Trademark of Huntington Alloys, Inc. of International Nickel, alloys for corrosion resistant alloys of nickel and chromium.
[4]Trademark of Huntington Alloys, Inc., alloys for corrosion resistant alloys of nickel and chromium.
[5]Trademark of United Technology.
[6]Trademark of Thermadyne (of St. Louis, MO) for cobalt-chromium, tungsten alloys.

As can be seen from the data, the alloy of the invention has the ability to retain 75% of its ultimate tensile strength at 1600° F. than it had at ambient.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A material handling apparatus for processing heated formed ferrous metal products and/or hot glass products, comprising:
   a cast metal apparatus having an as-cast structure consisting essentially of
   a face centered cubic intermetallic single phase of metal aluminide and having the property of retaining at least 75% of its ultimate tensile strength as measured at room temperature when heated to about 1600° F. wherein the metal of the metal aluminide consists essentially of nickel, aluminum and chromium, wherein the nickel ranges from 74–87.3 weight percent; chromium is present in an amount from about 6 to 10% by weight and aluminum is present in an amount of 6 to 14 percent by weight.

2. The apparatus of claim 1 wherein the metal aluminide further contains iron in the amount from about 0.001% to about 15% by wt.

3. The apparatus of claim 1 wherein the aluminide is a tri-nickel aluminide.

4. The apparatus of claim 1 further comprising an alloying amount of the following element selected from the group consisting of boron, silicon, hafnium, columbium, tantalum, tungsten, molybdenum and zirconium, and mixtures thereof wherein the amount of the alloying element is from 0.001 to 5% by wt. of the metal aluminide.

5. The apparatus of claim 1 wherein the metal aluminide is further comprised of molybdenum in an amount of about 2% to 4% by weight; zirconium in the amount of 0% to 1.5%; and boron in the amount of 200 ppm to about 1,000 ppm.

6. The apparatus of claim 1, wherein the apparatus is selected from the group consisting of extractors, slab heating/reheating furnace rolls, transfer rolls, scale breaker rolls, broadside mill rolls, hot slab shears and edgers, roughing mill rolls, slab reducer rolls, crop end shears, finishing rolls, hot saws, skelp rolls, seamless pipe piercing and drawing equipment, transfer troughs, rotary rolls, roll guides and extrusion dies.

7. The apparatus of claim 1 wherein the metal aluminide consists essentially of the following components:

| Nickel | 78.9 to 79.9 |
| Aluminum | 8.0 to 8.5 |
| Chromium | 7.5 to 8.0 |
| Molybdenum | 2.9 to 3.2 |
| Zirconium | 0.6 to 0.9 |
| Boron | 200 to 500 ppm. |

8. A roll useful for transferring heated formed ferrous metal products and/or glass products comprising a cast metal roll having an as-cast structure consisting essentially of a face centered cubic intermetallic single phase of metal aluminide and having the property of retaining its ultimate tensile strength at 1600° F. of at least 75% of its tensile strength at ambient room temperature wherein the metal of the metal aluminide consists essentially of nickel, aluminum and chromium, wherein the nickel ranges from 74–87.3 weight percent; chromium is present in an amount from about 6 to 10% by weight and aluminum is present in amount of 6 to 14 percent by weight.

9. The roll of claim 8 wherein the metal is further comprised of iron in the amount from about 0.001% to about 15% by wt.

10. The roll of claim 8 wherein the aluminide is a tri-nickel aluminide.

11. The roll of claim 8 further comprising an alloying amount of the following element selected from the group consisting of boron, silicon, hafnium, columbium, tantalum, tungsten, molybdenum and zirconium, and mixtures thereof wherein the amount of the alloying element is from 0.001 to 5% by wt. of the metal aluminide.

12. The roll of claim 8 wherein the metal aluminide consists essentially of:

| Nickel | 78.9 to 79.9 |
| Aluminum | 8.0 to 8.5 |
| Chromium | 7.5 to 8.0 |
| Molybdenum | 2.9 to 3.2 |
| Zirconium | 0.6 to 0.9 |
| Boron | 200 to 500 ppm. |

* * * * *